US012806591B2

(12) United States Patent
Pretz et al.

(10) Patent No.: US 12,806,591 B2
(45) Date of Patent: Nov. 24, 2026

(54) RISERS DESIGNED TO ACCOMMODATE THERMAL EXPANSION

(71) Applicant: Dow Global Technologies LLC, Midland, MI (US)

(72) Inventors: Matthew T. Pretz, Lake Jackson, TX (US); Donald F. Shaw, Forked River, NJ (US); Richard Edwards Walter, Long Valley, NJ (US); Fermin Alejandro Sandoval, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 780 days.

(21) Appl. No.: 18/257,364

(22) PCT Filed: Dec. 14, 2021

(86) PCT No.: PCT/US2021/063221

§ 371 (c)(1),
(2) Date: Jun. 14, 2023

(87) PCT Pub. No.: WO2022/132703

PCT Pub. Date: Jun. 23, 2022

(65) Prior Publication Data

US 2024/0024837 A1 Jan. 25, 2024

Related U.S. Application Data

(60) Provisional application No. 63/126,094, filed on Dec. 16, 2020.

(51) Int. Cl.
*B01J 8/18* (2006.01)
*B01J 8/26* (2006.01)

(52) U.S. Cl.
CPC .......... *B01J 8/1872* (2013.01); *B01J 8/1863* (2013.01); *B01J 8/26* (2013.01); *B01J 2208/00991* (2013.01)

(58) Field of Classification Search
CPC ........ B01J 8/1872; B01J 8/1863; B01J 8/125; B01J 8/26; B01J 8/30; B01J 2208/00991
See application file for complete search history.

(56) References Cited

U.S. PATENT DOCUMENTS 3,475,326 A 10/1969 Luckenbach
3,645,992 A 2/1972 Elston
(Continued)

FOREIGN PATENT DOCUMENTS

CA 2073842 A1 7/1992
CN 104437274 B 3/2015
(Continued)

OTHER PUBLICATIONS

International Search Report and Written Opinion dated Apr. 8, 2022, pertaining to International Patent Application No. PCT/US2021/063293.

(Continued)

*Primary Examiner* — Lessanework Seifu
(74) *Attorney, Agent, or Firm* — Dinsmore & Shohl LLP

(57) ABSTRACT

According to one or more embodiments of the present disclosure, a riser may include a lower riser portion, where the lower riser portion terminates at an upper end of the vertical riser segment, and an upper riser portion including a lower end, where the lower end of the upper riser portion may be positioned around the upper end of the vertical riser segment of the lower riser portion. The riser may also include a first guide and a second guide each positioned on opposite sides of the interior of the lower end of the upper riser portion. The vertical riser segment of the lower riser (Continued)

portion may be guided in a direction substantially parallel with the outer surface of the first guide and the outer surface of the second guide when the lower riser portion expands or contracts due to changes in temperature.

12 Claims, 5 Drawing Sheets

(56) References Cited

U.S. PATENT DOCUMENTS

| | | | |
|---|---|---|---|
| 3,914,342 A | 10/1975 | Mitchell | |
| 4,076,698 A | 2/1978 | Anderson et al. | |
| 4,502,947 A | 3/1985 | Haddad et al. | |
| 4,547,341 A | 10/1985 | Weber | |
| 4,579,716 A | 4/1986 | Krambeck et al. | |
| 4,588,558 A | 5/1986 | Kam et al. | |
| 4,599,392 A | 7/1986 | McKinney et al. | |
| 4,725,410 A | 2/1988 | Krug et al. | |
| 5,156,817 A | 10/1992 | Luckenbach | |
| 5,190,650 A | 3/1993 | Tammera et al. | |
| 5,272,236 A | 12/1993 | Lai et al. | |
| 5,275,641 A | 1/1994 | Tammera et al. | |
| 5,368,721 A * | 11/1994 | Terry | C10G 11/18 208/153 |
| 5,540,893 A | 7/1996 | English | |
| 5,582,923 A | 12/1996 | Kale et al. | |
| 5,722,236 A | 3/1998 | Cullen et al. | |
| 5,733,155 A | 3/1998 | Sagawa | |
| 5,854,045 A | 12/1998 | Fang et al. | |
| 6,857,814 B2 | 2/2005 | Jensen | |
| 7,272,204 B2 | 9/2007 | Jensen | |
| 7,476,428 B2 | 1/2009 | Burki et al. | |
| 8,669,406 B2 | 3/2014 | Pretz et al. | |
| 9,695,306 B2 | 7/2017 | Ambroise | |
| 9,802,394 B2 | 10/2017 | Cavacas et al. | |
| 10,357,913 B2 | 7/2019 | Dou et al. | |
| 2004/0076554 A1 | 4/2004 | Kuechler et al. | |
| 2006/0130443 A1 * | 6/2006 | Dirkse | B04C 5/26 55/345 |
| 2008/0050545 A1 | 2/2008 | Harvey | |
| 2009/0155584 A1 | 6/2009 | Rolland et al. | |
| 2009/0283445 A1 | 11/2009 | Tammera et al. | |
| 2012/0028058 A1 | 2/2012 | Paolilli et al. | |
| 2012/0234725 A1 | 9/2012 | Palmas et al. | |
| 2017/0361295 A1 | 12/2017 | Pretz et al. | |
| 2018/0134012 A1 | 5/2018 | Barreneche | |
| 2019/0314782 A1 | 10/2019 | Pretz et al. | |
| 2020/0231521 A1 | 7/2020 | Pretz et al. | |
| 2020/0346177 A1 | 11/2020 | Amblard et al. | |

FOREIGN PATENT DOCUMENTS

| | | | |
|---|---|---|---|
| EP | 1046696 | A2 | 10/2000 |
| EP | 1628774 | B1 | 4/2012 |
| EP | 2064057 | B1 | 3/2017 |
| EP | 3227370 | B1 | 11/2019 |
| JP | 1954001975 | B | 4/1954 |
| JP | H10-311893 | A | 11/1998 |
| JP | 2000233471 | A | 8/2000 |
| JP | 5479067 | B2 | 2/2014 |
| JP | 2014175121 | A | 9/2014 |
| JP | 2020519487 | A | 7/2020 |
| WO | 1995000603 | A1 | 1/1995 |
| WO | 2007117384 | A1 | 10/2007 |
| WO | 2015173199 | A1 | 11/2015 |
| WO | 2017139031 | A1 | 8/2017 |
| WO | 2017186953 | A1 | 11/2017 |
| WO | 2018069029 | A1 | 4/2018 |
| WO | 2018071513 | A1 | 4/2018 |
| WO | 2018200366 | A1 | 11/2018 |
| WO | 2019126189 | A1 | 6/2019 |
| WO | 2019191825 | A1 | 10/2019 |
| WO | 2019243456 | A1 | 12/2019 |
| WO | 2020009860 | A1 | 1/2020 |
| WO | 2020046978 | A1 | 3/2020 |
| WO | 2020112148 | A1 | 4/2020 |
| WO | 2020167929 | A1 | 8/2020 |
| WO | 2020263884 | A1 | 12/2020 |
| WO | 2021024119 | A1 | 2/2021 |
| WO | 2021118739 | A1 | 6/2021 |

OTHER PUBLICATIONS

International Search Report and Written Opinion dated Mar. 29, 2022, pertaining to International Patent Application No. PCT/US2021/063220.

International Search Report and Written Opinion issued by the European Patent Office acting as International Searching Authority for International Patent Application No. PCT/US2021/063211 dated Mar. 14, 2022 (16 total pages).

International Search Report and Written Opinion issued by the European Patent Office acting as International Searching Authority for International Patent Application No. PCT/US2021/063221 dated Mar. 14, 2022 (16 total pages).

Chinese Office Action dated Oct. 29, 2025, pertaining to CN Patent Application No. 202180082415.6, 8 pgs.

US Non-Final Office Action dated Oct. 29, 2025, pertaining to U.S. Appl. No. 18/257,329, 14 pgs.

Grace et al., "Introduction to circulating fluidized beds." Circulating Fluidized Beds (1997), pp. 1-20.

Brazilian Technical Report dated Feb. 5, 2026, pertaining to BR Patent Application No. BR112023011215.0, 8 pgs.

Brazilian Technical Report dated Feb. 18, 2026, pertaining to BR Patent Application No. BR112023011226.5, 8 pgs.

Brazilian Technical Report dated Feb. 26, 2026, pertaining to BR Patent Application No. BR112023011402.0, 8 pgs.

Chinese Office Action dated Mar. 18, 2026, pertaining to CN Patent Application No. 202180082620.2, 13 pgs.

US Non-Final Office Action dated Mar. 25, 2026, pertaining to U.S. Appl. No. 18/681,733 6 pgs.

Chinese Office Action dated Apr. 4, 2026, pertaining to CN Patent Application No. 202280054164.5, 15 pgs.

US Non-Final Office Action dated Apr. 20, 2026, pertaining to U.S. Appl. No. 18/681,732, 6 pgs.

US Non-Final Office Action dated Apr. 29, 2026, pertaining to U.S. Appl. No. 18/257,328, 10 pgs.

US Notice of Allowance dated May 6, 2026, pertaining to U.S. Appl. No. 18/257,361, 9 pgs.

Korean Office Action dated Nov. 27, 2025, pertaining to KR Patent Application No. 10-2023-7023305, 7 pgs.

Chinese Office Action dated Dec. 19, 2025, pertaining to CN Patent Application No. 202180081720.3, 10 pgs.

Chinese Office Action dated Dec. 24, 2025, pertaining to CN Patent Application No. 202280054178.7, 15 pgs.

Saudi Arabian Substantive Examination Report dated Mar. 19, 2024, pertaining to SA Patent Application No. 523441242, 17 pgs.

Japanese Notice of Reasons for Refusal dated Jan. 28, 2026, pertaining to JP Patent Application No. 2023-535021, 6 pgs.

Kuwait Office Action dated Apr. 13, 2025, pertaining to KW Patent Application No. KW/P/2023/003387, 7 pgs.

Chinese Office Action dated Jun. 20, 2025, pertaining to CN Patent Application No. 2021800824156, 14 pgs.

Saudi Arabian Substantive Examination Report dated Apr. 7, 2024, pertaining to SA Patent Application No. 523441058, 5 pgs.

Russian Office Action dated Apr. 22, 2024, pertaining to RU Patent Application No. 2023117790, 14 pgs.

US Non-Final Office Action dated May 6, 2025, pertaining to U.S. Appl. No. 18/257,329, 17 pgs.

Sadeghbeigi "Fluid Catalytic Cracking Handbook," Chapter 11, pp. 223, 224, 239, 240 Elsevier. https://app.knovel.com/hotlink/pdf/id:kt009IVL13/fluid-catalytic-cracking/refractory-quality (Year: 2012).

Kuwait Examination Report dated Apr. 28, 2025, pertaining to KW Patent Application No. KW/P/2023/003388, 6 pgs.

Saudi Arabian Second Substantive Examination Report dated Dec. 9, 2024, pertaining to SA Patent Application No. 523441106, 7 pgs.

(56) References Cited

OTHER PUBLICATIONS

International Search Report and Written Opinion dated Nov. 29, 2022, pertaining to Int'l Patent Application No. PCT/US2022/075061.
International Search Report and Written Opinion dated Nov. 30, 2022, pertaining to Int'l Patent Application No. PCT/US2022/041037.
Japanese Office Action dated Apr. 22, 2026, pertaining to JP Patent Application No. 2024-509478, 8 pgs.
US Notice of Allowance dated May 19, 2026, pertaining to U.S. Appl. No. 18/257,329, 10 pgs.
Chinese Office Action dated Jun. 3, 2026, pertaining to CN Patent Application No. 202180081370.0, 11 pgs.
Japanese Office Action dated May 25, 2026, pertaining to JP Patent Application No. 2024-509477, 6 pgs.
Brazilian Technical Report dated Jul. 30, 2026, pertaining to BR Patent Application No. BR112024002428-8, 8 pgs.
Brazilian Technical Report dated Jul. 29, 2026, pertaining to BR Patent Application No. BR112024002426-1, 8 pgs.
US Notice of Allowance dated Jul. 22, 2026, pertaining to U.S. Appl. No. 18/681,733, 5 pgs.
US Notice of Allowance dated Aug. 4, 2026, pertaining to U.S. Appl. No. 18/257,328, 7 pgs.

* cited by examiner

RISERS DESIGNED TO ACCOMMODATE THERMAL EXPANSION

CROSS-REFERENCE TO RELATED APPLICATIONS

This application is a National Stage Entry under 35 U.S.C. § 371 of International Patent Application No. PCT/US2021/063221, filed Dec. 14, 2021, which claims the benefit of and priority to U.S. Provisional Patent Application Ser. No. 63/126,094 filed on Dec. 16, 2020, and entitled "Risers Designed to Accommodate Thermal Expansion," the entire contents of both of which are incorporated by reference in the present disclosure.

TECHNICAL FIELD

Embodiments described herein generally relate to chemical processing systems and, more specifically, to systems designed to accommodate thermal expansion and contraction.

BACKGROUND

Many chemicals provide feedstocks for forming basic materials. For example, light olefins may be utilized as base materials to produce many types of goods and materials, where ethylene may be utilized to manufacture polyethylene, ethylene chloride, or ethylene oxides. Such products may be utilized in product packaging, construction, textiles, etc. Thus, there is an industry demand for light olefins, such as ethylene, propylene, and butene. Some chemicals, such as light olefins, may be produced by reaction processes that utilize riser reactors. Risers may be used in reaction, as well as the regeneration of catalysts utilized in the process.

SUMMARY

In some embodiments, such as those described herein, risers may be utilized which are non-vertical. For example, portions of such non-vertical risers may be diagonal in orientation. However, complications may arise in the design of chemical processing systems which utilize such risers. For example, designs in many embodiments should be able to account for the thermal expansion and contraction of the various system units during the production of various chemicals, including, but not limited to light olefins. Additionally, as reactors become large and heavy, designing mechanical support systems for reactor systems becomes troublesome. As is identified by the present disclosure, non-vertical risers that expand under hot conditions introduce significant horizontal expansion of the riser, whereas many conventional risers are strictly vertical in orientation and expand only vertically.

Presently disclosed risers address these problems in some or all respects. The risers disclosed herein may include two distinct riser portions, which allows for the riser portion including the non-horizontal segment to move horizontally when expanded or contacted relative to a fixed portion that is vertical in orientation. In one or more embodiments, a riser may comprise an upper riser portion, a lower riser portion that includes a non-vertical segment, and guides positioned to keep the upper riser portion aligned with the lower riser portion as the lower riser undergoes thermal expansion and contraction of the non-vertical segment, causing horizontal movement of the lower riser portion relative to the upper riser portion. In one or more embodiments, guides may direct the upper riser portion and lower riser portion to "slide" past one another in a controlled manner as temperatures of these components change. Proper alignment of the upper and lower riser portions as the riser undergoes thermal expansion may ensure that the flow of gasses and particulate solids through the riser is consistent across a wide range of temperatures. Additionally, proper alignment of the upper and lower riser portions may reduce stress between the upper and lower riser portions and between the riser and the system components with which the riser interacts as the riser undergoes thermal expansion and contraction.

According to one or more embodiments disclosed herein, a riser may be designed to accommodate thermal expansion. The riser may comprise a lower riser portion comprising a non-vertical riser segment and a vertical riser segment. The non-vertical riser segment may be positioned below the vertical riser segment. The lower riser portion may terminate at an upper end of the vertical riser segment. The riser may further comprise an upper riser portion comprising a lower end. The upper riser portion may be vertical. The lower end of the upper riser portion may be positioned around the upper end of the vertical riser segment of the lower riser portion. The riser may further comprise a first guide and a second guide each positioned on opposite sides of the interior of the lower end of the upper riser portion. Each of the first guide and the second guide may comprise an outer surface. The outer surface of the first guide and the outer surface of the second guide may be substantially parallel. The outer surface of the first guide and the outer surface of the second guide may face one another. A distance between the outer surface of the first guide and the outer surface of the second guide may be no more than 3% greater than the diameter of the upper end of the lower riser portion such that the vertical riser segment of the lower riser portion moves in a direction substantially parallel with the outer surface of the first guide and the outer surface of the second guide when the lower riser portion expands or contracts due to changes in temperature.

According to one or more embodiments disclosed herein, a particulate solid separation section of a reactor system may comprise an outer shell defining an interior region of the particulate solid separation section. The outer shell may comprise a riser port. A riser may extend through the riser port. The riser may comprise a lower riser portion comprising a non-vertical riser segment and a vertical riser segment. The non-vertical riser segment may be positioned below the vertical riser segment. The lower riser portion may terminate at an upper end of the vertical riser segment. The riser may further comprise an upper riser portion comprising a lower end. The upper riser portion may be vertical. The lower end of the upper riser portion may be positioned around the upper end of the vertical riser segment of the lower riser portion. The riser may further comprise a first guide and a second guide each positioned on opposite sides of the interior of the lower end of the upper riser portion. Each of the first guide and the second guide may comprise an outer surface. The outer surface of the first guide and the outer surface of the second guide may be substantially parallel. The outer surface of the first guide and the outer surface of the second guide may face one another. A distance between the outer surface of the first guide and the outer surface of the second guide may be no more than 3% greater than the diameter of the upper end of the lower riser portion such that the vertical riser segment of the lower riser portion moves in a direction substantially parallel with the outer surface of the first guide and the outer surface of the second guide when the lower riser portion expands or contracts due to changes in temperature.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description that follows, and in part will be readily apparent to those skilled in the art from that description or recognized by practicing the technology as described herein, including the detailed description that follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
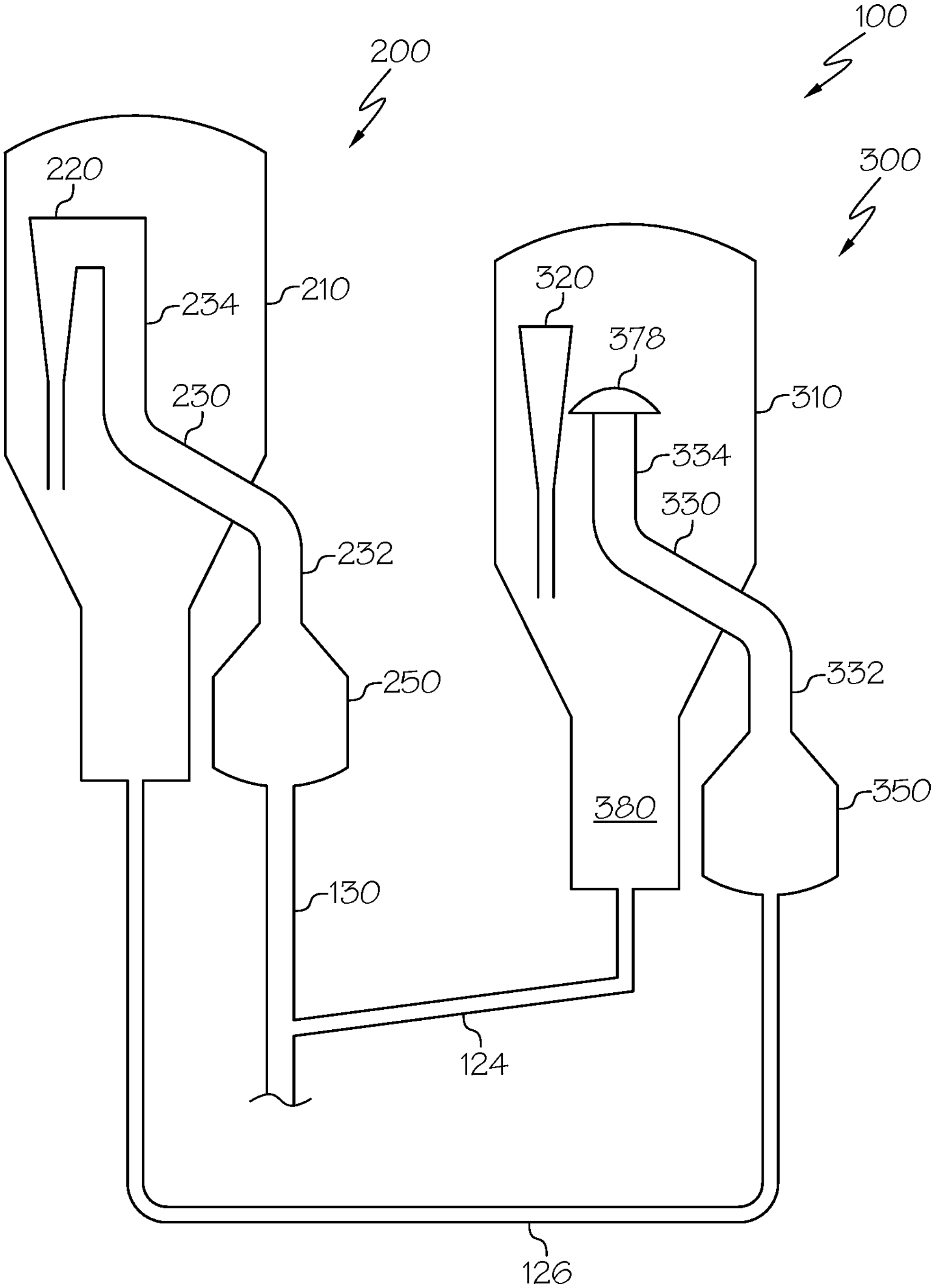
FIG. 1 schematically depicts a reactor system, according to one or more embodiments disclosed herein.

It should be understood that the drawings are schematic in nature, and do not include some components of a fluid catalytic reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described herein are one or more embodiments of riser apparatuses. In some embodiments disclosed herein, the riser apparatuses are disclosed for use in reactor sections of reactors systems that also include a regeneration section. Such embodiments may utilize a recycled solid catalyst in a fluidized bed. Specific example embodiments disclose the supported riser apparatuses in use in dehydrogenation reaction systems designed to form light olefins. However, it should be understood that the riser apparatuses disclosed herein may be utilized in a wide variety of chemical processes and systems. As would be appreciated by one skilled in the art, the technology disclosed herein may find wide applicability to mechanical design of chemical processing systems that utilize risers and, in particular, utilize risers which have some non-vertical component.

In a non-limiting example described herein, a riser may be utilized within reactor systems for producing light olefins from hydrocarbon feed streams. The reactor systems and methods for producing light olefins will now be discussed in detail. Now referring to FIG. 1, an example reactor system 100 is schematically depicted. The reactor system 100 generally comprises multiple system units, such as a reactor section 200 and a regenerator section 300. As used herein in the context of FIG. 1, a reactor section 200 generally refers to the portion of a reactor system 100 in which the major process reaction takes place, and the particulate solids are separated from the olefin-containing product stream of the reaction. In one or more embodiments, the particulate solids may be spent, meaning that they are at least partially deactivated. Also, as used herein, a regenerator section 300 generally refers to the portion of a fluid catalytic reactor system where the particulate solids are regenerated, such as through combustion, and the regenerated particulate solids are separated from the other process material, such as evolved gasses from the combusted material previously on the spent particulate solids or from supplemental fuel. The reactor section 200 generally includes a reaction vessel 250, a riser 230 including an exterior riser segment 232 and an interior riser segment 234, and a particulate solid separation section 210. The regenerator section 300 generally includes a particulate solid treatment vessel 350, a riser 330 including an exterior riser segment 332 and an interior riser segment 334, and a particulate solid separation section 310. Generally, the particulate solid separation section 210 may be in fluid communication with the particulate solid treatment vessel 350, for example, by standpipe 126, and the particulate solid separation section 310 may be in fluid communication with the reaction vessel 250, for example, by standpipe 124 and transport riser 130.

Generally, the reactor system 100 may be operated by feeding a hydrocarbon feed and fluidized particulate solids into the reaction vessel 250, and reacting the hydrocarbon feed by contact with fluidized particulate solids to produce an olefin-containing product in the reaction vessel 250 of the reactor section 200. The olefin-containing product and the particulate solids may be passed out of the reaction vessel 250 and through the riser 230 to a gas/solids separation device 220 in the particulate solid separation section 210, where the particulate solids may be separated from the olefin-containing product. The particulate solids may then be transported out of the particulate solid separation section 210 to the particulate solid treatment vessel 350. In the particulate solid treatment vessel 350, the particulate solids may be regenerated by chemical processes. For example, the spent particulate solids may be regenerated by one or more of oxidizing the particulate solid by contact with an oxygen containing gas, combusting coke present on the particulate solids, and combusting a supplemental fuel to heat the particulate solid. The particulate solids may then be passed out of the particulate solid treatment vessel 350 and through the riser 330 to a riser termination device 378, where the gas and particulate solids from the riser 330 are partially separated. The gas and remaining particulate solids from the riser 330 are transported to gas/solids separation device 320 in the particulate solid separation section 310 where the remaining particulate solids are separated from the gasses from the regeneration reaction. The particulate solids, separated from the gasses, may be passed to a solid particulate collection area 380. The separated particulate solids are then passed from the solid particulate collection area 380 to the reaction vessel 250, where they are further utilized. Thus, the particulate solids may cycle between the reactor section 200 and the regenerator section 300.

As described herein, portions of system units such as reaction vessel walls, separation section walls, or riser walls, may comprise a metallic material, such as carbon or stainless steel. In addition, the walls of various system units may have portions that are attached with other portions of the same system unit or to another system unit. Sometimes, the points of attachment or connection are referred to herein as "attachment points" and may incorporate any known bonding medium such as, without limitation, a weld, an adhesive, a solder, etc. It should be understood that components of the system may be "directly connected" at an attachment point, such as a weld. It should further be understood that two components that are "proximate" on another are in direct contact or immediately near one another such that a relatively small intermediate parts such as connectors or adhesive materials connects them.

Figure 2:
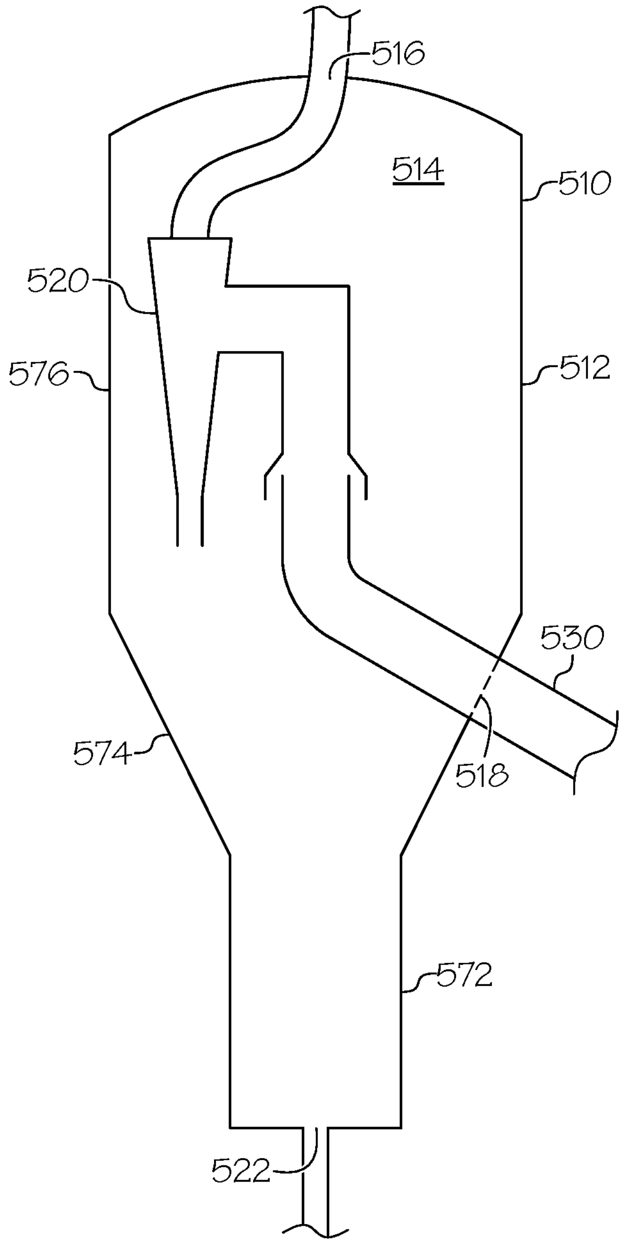
FIG. 2 schematically depicts a particulate solid separation section, according to one or more embodiments disclosed herein.

Referring now to FIG. 2, a supported riser apparatus 500 may be at least partially housed within a vessel 510 and the supported riser apparatus 500 may comprise a riser 530, a support member 540, a support structure 550, and an expansion guide 560. As is described herein, the vessel 510 may be representative of the particulate solid separation section 210 or 310 of FIG. 1. However, it should be understood that the embodiment of FIG. 2 may be utilized in other systems than that represented by FIG. 1.

Referring to FIG. 2, a particulate solid separation section 510 is depicted. In one or more embodiments, particulate solid separation section 510 may be present in reactor system 100 as either particulate solid separation section 210 in the reactor section 200 or as particulate solid separation section 310 in the regenerator section 300. It should be understood that particulate solid separation section 510 may be utilized in further reactor systems not described in relation to reactor system 100 of FIG. 1. Additionally, it should be understood that riser 530 may be utilized in any system in which such a riser would be suitable, not limited to reactor system 100 or solid separation section 200. As such, the particulate solid separation section 510 and the riser 530 are described in the context of reactor system 100, but are not limited to use in such a reactor system.

As depicted in FIG. 2, the particulate solid separation section 510 may comprise an outer shell 512 where the outer shell 512 may define an interior region 514 of the particulate solid separation section 510. The outer shell 512 may comprise a riser port 518, a gas outlet port 516, and a particulate solid outlet port 522. The particulate solid separation section 510 may house at least a portion of the riser 530 and a gas/solids separation device 520 in the interior region 514 of the particulate solid separation section 510.

Generally, "inlet ports" and "outlet ports" of any system unit described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit to which a pipe, conduit, tube, hose, transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures. Other ports, such as the riser port 518, may comprise an opening in the given system unit where other system units are directly attached, such as where the riser 530 extends into the particulate solid separation section 510 at the riser port 518.

In one or more embodiments, the outer shell 512 of the particulate solid separation section 510 may define an upper segment 576, a middle segment 574, and a lower segment 572 of the particulate solid separation section 510. Generally, the upper segment 576 may have a substantially constant cross sectional area, such that the cross sectional area does not vary by more than 20% in the upper segment 576. In one or more embodiments, the cross sectional area of the upper segment 576 may be at least three times the maximum cross sectional area of the riser 530. For example, the cross sectional area of the upper segment 576 may be at least 3 times, at least 4 times, at least 5 times, at least 6 times, at least 7 times, at least 8 times, at least 9 times, at least 10 times, at least 12 times, at least 15 times, or even at least 20 times the maximum cross sectional area of the riser 530. In further embodiments, the maximum cross sectional area of the upper segment 576 may be from 5 to 40 times the maximum cross sectional area of the riser 530. For example, the maximum cross sectional area of the upper segment 576 may be from 5 to 40, from to 40, from 15 to 40, from 20 to 40, from 25 to 40, from 30 to 40, from 35 to 40, from 5 to 35, from 5 to 30, from 5 to 25, from 5 to 20, from 5 to 15, or even from 5 to 10 times the maximum cross sectional area of the riser 530. As described herein, unless otherwise explicitly stated, the "cross sectional area" refers to the area of the cross section of a portion of a system unit in a plane substantially orthogonal to the direction of general flow of reactants and/or products.

Additionally, in one or more embodiments, the lower segment 572 of the particulate solid separation section 510 may have a substantially constant cross sectional area, such that the cross sectional area does not vary by more than 20% in the lower segment 572. The cross sectional area of the lower segment 572 may be larger than the maximum cross sectional area of the riser 530 and smaller than the maximum cross sectional area of the upper segment 576. The middle segment 574 may be shaped as a frustum where the cross sectional area of the middle segment 574 is not constant and the cross sectional area of the middle segment 574 transitions from the cross sectional area of the upper segment 576 to the cross sectional area of the lower segment 572 throughout the middle segment 574.

According to one or more embodiments, in the upper segment 576 of the particulate solid separation section 510, the riser 530 may be in fluid communication with the gas/solids separation device 520. For example, the riser 530 may be directly connected to the gas/solids separation device 520, as depicted in FIG. 2. The gas/solids separation device 520 may be any mechanical or chemical separation device that may be operable to separate particulate solids from gas or liquid phases, such as a cyclone or a plurality of cyclones.

According to one or more embodiments, the gas/solids separation device 520 may be a cyclonic separation system, which may include two or more stages of cyclonic separation. In embodiments where the gas/solids separation device 520 comprises more than one cyclonic separation stages, the first separation device into which the fluidized stream enters is referred to a primary cyclonic separation device. The fluidized effluent from the primary cyclonic separation device may enter into a secondary cyclonic separation device for further separation. Primary cyclonic separation devices may include, for example, primary cyclones, and systems commercially available under the names VSS (commercially available from UOP), LD2 (commercially available from Stone and Webster), and RS2 (commercially available from Stone and Webster). Primary cyclones are described, for example, in U.S. Pat. Nos. 4,579,716; and 5,275,641, which are each incorporated by reference in their entirety herein. In some separation systems utilizing primary cyclones as the primary cyclonic separation device, one or more set of additional cyclones, e.g. secondary cyclones and tertiary cyclones, are employed for further separation of the particulate solids from the product gas. It should be understood that any primary cyclonic separation device may be used in embodiments disclosed herein.

In one or more alternative embodiments, the outer shell 512 may further house a riser termination device, not depicted in FIG. 2. The riser termination device may be positioned at the end of riser 530. In one or more embodiments, the riser termination device may be directly connected to the riser 530. The gas and particulate solids passing through the riser 530 may be at least partially separated by riser termination device. The gas and remaining particulate solids may be transported to a secondary separation device, gas/solids separation device 520 in the particulate solid separation section 510.

Generally, the gas/solids separation device 520 may be operable to deposit separated particulate solids into the bottom of the upper segment 576 or into the middle segment 574 or lower segment 572 of the particulate solid separation section 510. The separated vapors may be removed from the particulate solid separation section 510 via a pipe connected to gas outlet port 516 of the particulate solid separation section 510. Additionally, particulate solids may be removed from the particulate solid separation section 510 via a pipe connected to particulate solid outlet port 522.

In one or more embodiments, the riser 530 may be used in either the reactor section 200 or the regenerator section 300. As such, riser 530 may represent riser 230, riser 330, or both, according to one or more embodiments. Generally, the riser 530 may act to transport reactants, products, and/or particulate solids from a reaction vessel 250 or particulate solid treatment vessel 350 of FIG. 1 to the gas/solids separation device 220 or 320 housed within particulate solid separation section 210 or 310. In one or more embodiments, the riser 530 may be generally cylindrical in shape (i.e., having a substantially circular cross sectional shape), or may alternately be non-cylindrically shaped, such as prism shaped with cross sectional shape of triangles, rectangles, pentagons, hexagons, octagons, ovals, or other polygons or curved closed shapes, or combinations thereof. The riser may generally include a metallic frame, and may additionally include refractory linings or other materials utilized to protect the metallic frame and/or control process conditions.

Figure 3:
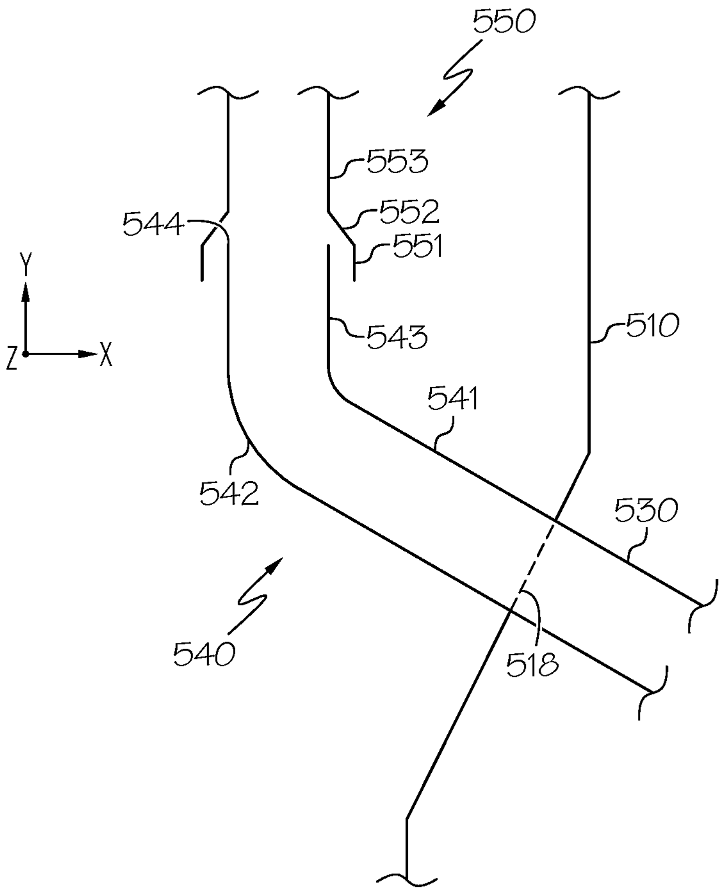
FIG. 3 schematically depicts an elevation view of a riser, according to one or more embodiments disclosed herein.

Referring now to FIG. 3, the riser 530 may comprise a lower riser portion 540 and an upper riser portion 550. The lower riser portion 540 may comprise a non-vertical riser segment 541, and a vertical riser segment 543. The non-vertical riser segment 541 may be positioned below the vertical riser segment 543. In one or more embodiments, the lower riser portion 540 may further comprise a non-linear riser segment 542. As described herein, a "non-linear riser segment" may refer to a riser segment comprising a curve or a mitered junction. The non-linear riser segment 542 may be positioned between the vertical riser segment 543 and the non-vertical riser segment 541 and may connect the vertical riser segment 543 and the non-vertical riser segment 541. The vertical riser segment 543 may comprise an upper end 544 and the lower riser portion 540 may terminate at the upper end 544 of the vertical riser segment 543.

In one or more embodiments, the non-vertical riser segment 541 may extend through the riser port 518. As displayed in FIG. 3, the non-vertical riser segment 541 may extend through the riser port 518 in the X and Y directions, where the X direction is a horizontal direction and the Y direction is a vertical direction. According to one or more embodiments, the non-vertical riser segment may be adjacent to the riser port 518 or even directly connected to the riser port 518. The riser port 518 may be located in the outer shell 512 of the particulate solid separation section 510 in either the upper segment 576 or the middle segment 574 of the particulate solid separation section 510. As displayed in FIG. 2, the riser 530 extends through the riser port 518 in the middle segment 574 of the particulate solid separation section 510.

In one or more embodiments, the non-vertical riser segment 541 may extend through the riser port 518 in a diagonal direction where the diagonal direction is 15 to 75 degrees from vertical. For example, the diagonal direction may be from 15 to 75 degrees from vertical, from 20 to 75 degrees from vertical, from 25 to 75 degrees from vertical, from 30 to 75 degrees from vertical, from 35 to 75 degrees from vertical, from 40 to 75 degrees from vertical, from 45 to 75 degrees from vertical, from 50 to 75 degrees from vertical, from 55 to 75 degrees from vertical, from 60 to 75 degrees from vertical, from 65 to 75 degrees from vertical, from 70 to 75 degrees from vertical, from 15 to 70 degrees from vertical, from 15 to 65 degrees from vertical, from 15 to 60 degrees from vertical, from 15 to 55 degrees from vertical, from 15 to 50 degrees from vertical, from 15 to 45 degrees from vertical, from 15 to 40 degrees from vertical, from 15 to 35 degrees from vertical, from 15 to 30 degrees from vertical, from 15 to 25 degrees from vertical, from 15 to 20 degrees from vertical, or any combination or sub-combination of these ranges.

The upper riser portion 550 may be oriented substantially vertically. As described herein, "substantially vertically" refers to an orientation within 10 degrees, 5 degrees, or even 2 degrees of vertical. As displayed in FIGS. 3 and 5, the upper riser portion 550 may extend in the Y direction.

In one or more embodiments, the upper riser portion 550 may comprise a lower end 551. The lower end 551 of the upper riser portion 550 may be positioned around the upper end 544 of the vertical riser segment 543 of the lower riser portion 540. Furthermore, the lower end 551 of the upper riser portion 550 may be positioned concentrically around the upper end 544 of the vertical riser segment 543 of the lower riser portion 540. As described herein, objects may be "concentric" when they share the same center or share an axis. As such, the lower end 551 of the upper riser portion 550 and the vertical riser segment 543 of the lower riser portion 540 need not have circular cross sectional shapes for the lower end 551 of the upper riser portion 550 and the vertical riser segment 543 of the lower riser portion 540 to be positioned concentrically.

In one or more embodiments, the width of the lower end 551 of the upper riser portion 550 may be from 100% to 150% of the width of the vertical riser segment 543 of the lower riser portion 540. For example, the width of the lower end 551 of the upper riser portion 550 may be from 100% to 150%, from 110% to 150%, from 120% to 150%, from 130% to 150%, from 140% to 150%, from 100% to 140%, from 100% to 130%, from 100% to 120%, or even from 100% to 110% of the width of the vertical riser segment 543 of the lower riser portion 540.

The upper riser portion 550 may further comprise an upper segment 553, and a transition segment 552. The upper segment 553 may be positioned above the transition segment 552 and the transition segment may be positioned above the lower end 551 of the upper riser portion. In one or more embodiments, the width of the lower end 551 of the upper riser portion 550 may be from 100% to 150% of the width of the upper segment 553 of the upper riser portion 550. For example, the width of the lower end 551 of the upper riser portion 550 may be from 100% to 150%, from 110% to 150%, from 120% to 150%, from 130% to 150%, from 140% to 150%, from 100% to 140%, from 100% to 130%, from 100% to 120%, or even from 100% to 110% of the width of the upper segment 553 of the upper riser portion 550. In one or more embodiments, the width of the upper segment 553 of the upper riser portion 550 may be substantially the same as the width of the vertical riser segment 543 of the lower riser portion 540. For example, the width of the upper segment 553 of the upper riser portion 550 may be within 25%, 20%, 15%, 10%, 5% or even 1% of the width of the vertical riser segment 543 of the lower riser portion 540.

In one or more embodiments, the transition segment 552 of the upper riser portion 550 may not have a constant width, and the width of the transition segment 552 may change from the width of the lower end 551 of the upper riser portion 550 to the width of the upper segment 553 of the upper riser portion 550 over the height of the transition segment 552. As such, the transition segment 552 may be shaped as a frustum. The transition segment 552 may be positioned between the upper segment 553 and the lower end 551 of the upper riser portion 550. According to one or more embodiments, the transition segment 552 may be directly connected to the upper segment 553 and the lower end 551 of the upper riser portion 550.

Figure 4:
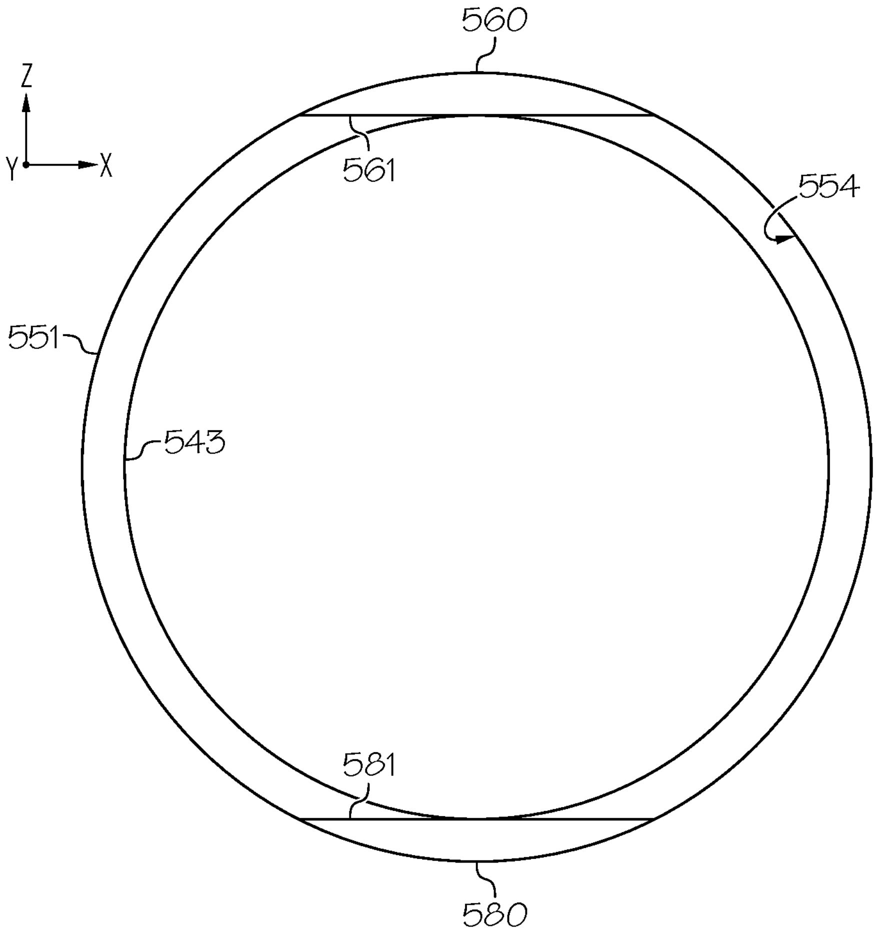
FIG. 4 schematically depicts a top view of a riser, according to one or more embodiments disclosed herein.
Figure 5:
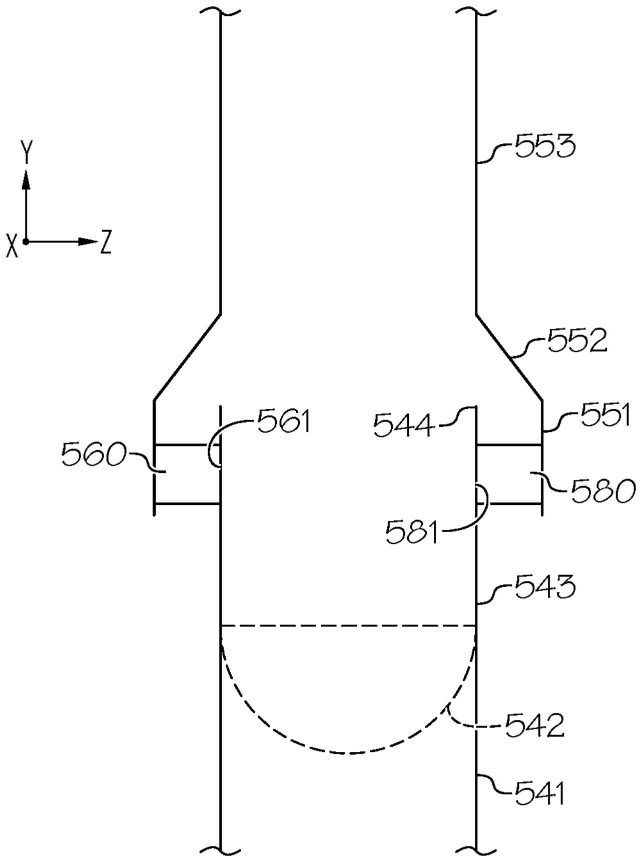
FIG. 5 schematically depicts a side view of a riser, according to one or more embodiments disclosed herein.

Referring to FIGS. 4 and 5, the riser 530 may further comprise a first guide 560 and a second guide 580. The first guide 560 and the second guide 580 may be positioned on an interior surface 554 of the lower end 551 of the upper riser portion 550. In one or more embodiments the first guide 560 and the second guide 580 may be directly connected to the interior surface 554 of the lower end 551 of the upper riser portion 550.

The first guide 560 may comprise an outer surface 561, and the second guide 580 may comprise an outer surface 581. The outer surface 561 of the first guide 560 may face outer surface 581 of the second guide 580. As such, the outer surface 561 of the first guide 560 and the outer surface 581 of the second guide 580 may be substantially parallel. As described herein, “substantially parallel” refers to an orientation within 10 degrees, within 5 degrees, or even within 2 degrees of parallel. Referring to FIGS. 4 and 5. The outer surface 561 of the first guide 560 and the outer surface 581 of the second guide 580 may be substantially parallel to a plane extending in the X and Y directions. As such, the outer surface 561 of the first guide 560 and the outer surface 581 of the second guide 580 may be substantially planar.

In one or more embodiments, the distance between the outer surface 561 of the first guide 560 and the outer surface 581 of the second guide 580 may be no more than 3% greater than the diameter of the upper end of the lower riser portion. For example, the distance between the outer surface 561 of the first guide 560 and the outer surface 581 of the second guide 580 may be no more than 3.0%, 2.5%, 2.0%, 1.5%, 1.0%, or even 0.5% greater than the diameter of the upper end of the lower riser portion. The distance between the outer surface 561 of the first guide 560 and the outer surface 581 of the second guide 580 may be measured in the Z direction according to FIGS. 4 and 5.

In one or more embodiments, the outer surface 561 of the first guide 560 and the outer surface 581 of the second guide 580 may be located proximate to the vertical riser segment 543 of the lower riser portion 540. According to one or more embodiments, one of the outer surface 561 of the first guide 560 or the outer surface 581 of the second guide 580 may come into contact with the vertical riser segment 543 of the lower riser portion 540. As such, the vertical riser segment 543 of the lower riser portion 540 may slide along the outer surface 561 or 581 of the first guide 560 or the second guide 580 as the lower riser portion 540 undergoes thermal expansion or contraction. The outer surface 561 of the first guide 560 and the outer surface 581 of the second guide may be sufficiently smooth to allow the vertical riser segment 543 to slide long the outer surface 561 or 581 in the X and Y directions.

In one or more embodiments, the vertical riser segment 543 of the lower riser portion 540 may further comprise one or more bumpers. The one or more bumpers may be positioned to contact or restrict movement in the direction of the outer surface 561 of the first guide 560, the outer surface 581 of the second guide 580, or both. The one or more bumpers may be sufficiently smooth to allow the vertical riser segment 543 to slide along the outer surface 561 or 581 in the X and Y directions. The one or more bumpers may additionally reduce wear on the vertical riser segment 543 that could occur from the vertical riser segment 543 sliding along the outer surface 561 of the first guide 560 or the outer surface 581 of the second guide. As such, the one or more bumpers may be replaceable.

As described herein, the riser 530 may undergo thermal expansion and contraction as the temperature of the riser 530 changes. The transportation of hot gasses and particulate solids through the riser 530 may increase the temperature of the riser 530, causing the riser to expand. Generally, the upper riser portion 550, which may be oriented vertically, expands in a generally vertical direction. Referring to FIGS. 3-5, the upper riser portion 550 may generally expand and contract in the Y direction. The lower riser portion 540 may comprise a vertical riser segment 543 and a non-vertical riser segment 541. Referring to FIGS. 3 and 5, the vertical riser segment 543 extends vertically in the Y direction and the non-vertical riser segment 541 extends in the X and Y directions. As such, the lower riser portion 540 may expand and contract both vertically and horizontally when undergoing thermal expansion or contraction.

Without wishing to be bound by theory, it is believed that the first guide 560 and the second guide 580 may keep the upper riser portion 550 and the lower riser portion 540 aligned as the upper riser portion 550 and the lower riser portion 540 undergo thermal expansion. Since the outer surface 561 of the first guide 560 and the outer surface 581 of the second guide 580 are parallel to a plane extending in the X and Y directions, the thermal expansion of the lower riser portion may be restricted to the X and Y directions, preventing movement in the Z direction. Movement of the lower riser portion 540 in the Z direction may cause a misalignment of the lower riser portion 540 with the upper riser portion 550. Such a misalignment may negatively affect the flow of gasses and particulate solids through the riser 530 at the joint between the lower riser portion 540 and the upper riser portion 550.

In one or more embodiments, the guides may restrict the eccentricity of the upper riser portion 550 and the lower riser portion 540 by mechanical means. As described herein, "eccentricity" refers to the amount by which the lower riser portion 540 is offset, or misaligned, from the upper riser portion 550. For example, when the lower riser portion 540 and the upper riser portion 550 are cylindrical, there is no eccentricity when the lower riser portion 540 and the upper riser portion 550 are concentric, and eccentricity increases until the lower riser portion 540 contacts the upper riser portion 550, at which point the lower riser portion 540 and the upper riser portion 550 are fully eccentric. The guides 560 and 580 prevent the lower riser portion 540 from contacting the upper riser portion 550 by restricting the movement of the lower riser portion 540 in the Z direction. As such, the guides 560 and 580 restrict the eccentricity of the upper riser portion 550 and the lower riser portion 540 by mechanical means.

In one or more embodiments, the riser 530 may be used in systems where the upper riser portion 550 is supported independently from the lower riser portion 540. Without wishing to be bound by theory, it is believed that the guides may keep the upper riser portion 550 and lower riser portion 540 aligned when the upper riser portion 550 is supported independently from the lower riser portion 540. For example, the riser 530 may be suitable for use in a reactor system, such as reactor section 200, where the upper riser portion 550 may be directly connected to, and supported by, a gas/solid separation device, such as gas/solid separation device 220. As such, it is also believed that in one or more embodiments, riser 530 may not be suitable for supporting heavy system components, such as a riser termination device.

In one or more embodiments, the riser 530 may further comprise any even number of guides, provided that the outer surface of each guide is substantially parallel to the outer surface 561 of the first guide 560 and the outer surface 581 of the second guide 580. Additionally, the distance between the outer surfaces of any further guides may be substantially the same as the distance between the outer surface 561 of the first guide 560 and the outer surface 581 of the second guide 580. For example, the riser 530 may further comprise a third guide and a fourth guide, a fifth guide and a sixth guide, a seventh guide and an eighth guide, and so on.

In one or more embodiments, additional guides may be positioned above or below the first guide 560 and the second guide 580. For example, a third guide may be positioned above the first guide 560, a fourth guide may be positioned above the second guide 580, a fifth guide may be positioned below the first guide 560 and a sixth guide may be positioned below the second guide 580. In such embodiments, a single plane extending in the X and Y directions may comprise the outer surfaces of the first guide, the third guide, and the fifth guide. Likewise, a single plane extending in the X and Y directions may comprise the outer surfaces of the second guide, the fourth guide, and the sixth guide.

Without wishing to be bound by theory, it is believed that positioning guides above or below the first guide 560 and the second guide 580 may ensure sufficient guidance for the lower riser portion 540 and the upper riser portion 550 as the lower riser portion 540 and upper riser portion 550 expand or contract vertically, in the Y direction of FIGS. 3-5. For example, when the lower riser portion 540 and the upper riser portion 550 are in a fully contracted state, the vertical riser segment 543 of the lower riser portion 540 may be located proximate to at least one set of guides.

In a first aspect of the present disclosure, a riser may be designed to accommodate thermal expansion. The riser may comprise a lower riser portion comprising a non-vertical riser segment and a vertical riser segment. The non-vertical riser segment may be positioned below the vertical riser segment. The lower riser portion may terminate at an upper end of the vertical riser segment. The riser may further comprise an upper riser portion comprising a lower end. The upper riser portion may be vertical. The lower end of the upper riser portion may be positioned around the upper end of the vertical riser segment of the lower riser portion. The riser may further comprise a first guide and a second guide each positioned on opposite sides of the interior of the lower end of the upper riser portion. Each of the first guide and the second guide may comprise an outer surface. The outer surface of the first guide and the outer surface of the second guide may be substantially parallel. The outer surface of the first guide and the outer surface of the second guide may face one another. A distance between the outer surface of the first guide and the outer surface of the second guide may be no more than 3% greater than the diameter of the upper end of the lower riser portion such that the vertical riser segment of the lower riser portion moves in a direction substantially parallel with the outer surface of the first guide and the outer surface of the second guide when the lower riser portion expands or contracts due to changes in temperature.

A second aspect of the present disclosure may include the first aspect where the lower riser portion further comprises a non-linear riser segment, and wherein the non-linear riser segment is positioned between the non-vertical riser segment and the vertical riser segment.

A third aspect of the present disclosure may include either of the first or second aspects where a width of the lower end of the upper riser portion is from 100% to 150% of the width of the vertical riser segment of the lower riser portion.

A fourth aspect of the present disclosure may include any of the first through third aspects where the upper riser portion further comprises an upper segment and wherein a width of the lower end of the upper riser portion is from 100% to 150% of the width of the upper segment of the upper riser portion.

A fifth aspect of the present disclosure may include any of the first through fourth aspects where the upper riser portion further comprises an upper segment and wherein a width of the upper segment of the upper riser portion is substantially the same as the width of the vertical riser segment of the lower riser portion.

A sixth aspect of the present disclosure may include any of the first through fifth aspects where the outer surface of the first guide and the outer surface of the second guide are substantially planar.

A seventh aspect of the present disclosure may include any of the first through sixth aspects where the lower end of the upper riser portion is positioned concentrically around the upper end of the vertical riser segment of the lower riser portion.

An eighth aspect of the present disclosure may include any of the first through seventh aspects where the riser comprises a substantially circular cross sectional shape.

In a ninth aspect of the present disclosure, a particulate solid separation section of a reactor system may comprise an outer shell defining an interior region of the particulate solid separation section. The outer shell may comprise a riser port. A riser may extend through the riser port. The riser may comprise a lower riser portion comprising a non-vertical riser segment and a vertical riser segment. The non-vertical riser segment may be positioned below the vertical riser segment. The lower riser portion may terminate at an upper end of the vertical riser segment. The riser may further comprise an upper riser portion comprising a lower end. The upper riser portion may be vertical. The lower end of the upper riser portion may be positioned around the upper end of the vertical riser segment of the lower riser portion. The riser may further comprise a first guide and a second guide each positioned on opposite sides of the interior of the lower end of the upper riser portion. Each of the first guide and the second guide may comprise an outer surface. The outer surface of the first guide and the outer surface of the second guide may be substantially parallel. The outer surface of the first guide and the outer surface of the second guide may face one another. A distance between the outer surface of the first guide and the outer surface of the second guide may be no more than 3% greater than the diameter of the upper end of the lower riser portion such that the vertical riser segment of the lower riser portion moves in a direction substantially parallel with the outer surface of the first guide and the outer surface of the second guide when the lower riser portion expands or contracts due to changes in temperature.

A tenth aspect of the present disclosure may include the ninth aspect where the non-vertical riser segment of the lower riser portion extends through the riser port in a diagonal direction, wherein the diagonal direction is from 15 to 75 degrees from vertical.

An eleventh aspect of the present disclosure may include either of the ninth or tenth aspects where the outer shell of the particulate solid separation section comprises an upper segment, a middle segment, and a lower segment, and wherein a maximum cross sectional area of the upper segment is at least three times the maximum cross sectional area of the riser.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. Additionally, the term "consisting essentially of" is used in this disclosure to refer to quantitative values that do not materially affect the basic and novel characteristic(s) of the disclosure.

It should be understood that any two quantitative values assigned to a property may constitute a range of that property, and all combinations of ranges formed from all stated quantitative values of a given property are contemplated in this disclosure.

The invention claimed is:

1. A riser designed to accommodate thermal expansion, the riser comprising:

a lower riser portion comprising a non-vertical riser segment and a vertical riser segment, wherein the non-vertical riser segment is positioned below the vertical riser segment, and where the lower riser portion terminates at an upper end of the vertical riser segment;

an upper riser portion comprising a lower end, wherein the upper riser portion is vertical, and wherein the lower end of the upper riser portion is positioned around the upper end of the vertical riser segment of the lower riser portion; and a first guide and a second guide each positioned on opposite sides of the interior of the lower end of the upper riser portion, wherein each of the first guide and the second guide comprise an outer surface, wherein the outer surface of the first guide and the outer surface of the second guide are substantially parallel, wherein the outer surface of the first guide and the outer surface of the second guide face one another, and wherein a distance between the outer surface of the first guide and the outer surface of the second guide is no more than 3% greater than a diameter of the upper end of the lower riser portion such that the vertical riser segment of the lower riser portion moves in two directions substantially parallel with the outer surface of the first guide and the outer surface of the second guide when the lower riser portion expands or contracts due to changes in temperature.

2. The riser of claim 1, wherein the lower riser portion further comprises a non-linear riser segment, and wherein the non-linear riser segment is positioned between the non-vertical riser segment and the vertical riser segment.

3. The riser of claim 1, wherein a width of the lower end of the upper riser portion is from 100% to 150% of the width of the vertical riser segment of the lower riser portion.

4. The riser of claim 1, wherein the upper riser portion further comprises an upper segment and wherein a width of the lower end of the upper riser portion is from 100% to 150% of the width of the upper segment of the upper riser portion.

5. The riser of claim 1, wherein the upper riser portion further comprises an upper segment and wherein a width of the upper segment of the upper riser portion is substantially the same as the width of the vertical riser segment of the lower riser portion.

6. The riser of claim 1, wherein the outer surface of the first guide and the outer surface of the second guide are substantially planar.

7. The riser of claim 1, wherein the lower end of the upper riser portion is positioned concentrically around the upper end of the vertical riser segment of the lower riser portion.

8. The riser of claim 1, wherein the riser comprises a substantially circular cross sectional shape.

9. The riser of claim 1, wherein the riser is a riser reactor.

10. A particulate solid separation section of a reactor system, the particulate solid separation section comprising:

an outer shell defining an interior region of the particulate solid separation section, wherein the outer shell comprises a riser port, and a riser extending through the riser port, the riser comprising:

a lower riser portion comprising a non-vertical riser segment and a vertical riser segment, wherein the non-vertical riser segment is positioned below the vertical riser segment, and where the lower riser portion terminates at an upper end of the vertical riser segment;

an upper riser portion comprising a lower end, wherein the upper riser portion is vertical, and wherein the lower end of the upper riser portion is positioned around the upper end of the vertical riser segment of the lower riser portion; and a first guide and a second guide each positioned on opposite sides of the interior of the lower end of the upper riser portion, wherein each of the first guide and the second guide comprise an outer surface, wherein the outer surface of the first guide and the outer surface of the second guide are substantially parallel, wherein the outer surface of the first guide and the outer surface of the second guide face one another, and wherein a distance between the outer surface of the first guide and the outer surface of the second guide is no more than 3% greater than a diameter of the upper end of the lower riser portion such that the vertical riser segment of the lower riser portion moves in two directions substantially parallel with the outer surface of the first guide and the outer surface of the second guide when the lower riser portion expands or contracts due to changes in temperature.

11. The particulate solid separation section of claim 10, wherein the non-vertical riser segment of the lower riser portion extends through the riser port in a diagonal direction, wherein the diagonal direction is from 15 to 75 degrees from vertical.

12. The particulate solid separation section of claim 10, wherein the outer shell of the particulate solid separation section comprises an upper segment, a middle segment, and a lower segment, and wherein a maximum cross sectional area of the upper segment is at least three times the maximum cross sectional area of the riser.

* * * * *